March 12, 1940.  E. F. VANDER VELDE  2,193,048
EDUCATIONAL DEVICE
Filed Dec. 28, 1936  2 Sheets-Sheet 1

Inventor
Elizabeth F. Vander Velde
By Roy A. Plant
Attorney

March 12, 1940. E. F. VANDER VELDE 2,193,048
EDUCATIONAL DEVICE
Filed Dec. 28, 1936 2 Sheets-Sheet 2

Inventor
Elizabeth F. Vander Velde
By Roy A. Plant
Attorney

Patented Mar. 12, 1940

2,193,048

UNITED STATES PATENT OFFICE 2,193,048

EDUCATIONAL DEVICE

Elizabeth F. Vander Velde, Battle Creek, Mich.

Application December 28, 1936, Serial No. 117,679

3 Claims. (Cl. 35—35)

The present invention relates to an educational device in the nature of a dictionary adapted particularly for the teaching of children of primary school age, or others who can be classed as non-readers. In its specific phases, the invention relates to a dictionary which defines words, such as nouns, by means of pictures, and with which may be used certain other apparatus which cooperates therewith and facilitates the use and advantages of the dictionary.

The present invention has been made in view of the problems involved in teaching children of primary school age, deaf children, and any others who, for one reason or another, do not fit into the regular school system, and particularly so with a view to producing a dictionary usable by the student to help himself, and hence increase his sense of self-reliance.

Accordingly, among the objects of the present invention is the provision of a dictionary that defines words or the like, preferably kindergarten expressions, by means of pictures.

Another object is to provide a dictionary type of teaching device that is more efficient and complete than anything heretofore used, and which overcomes many of the limitations and deficiencies of the devices of the prior art.

Another object is to provide such a dictionary wherein each page carries many words or the like and their pictorial definitions.

Another object is to provide such a dictionary with a tab or thumb index arranged alphabetically, and agreeing in script with the first letter of the words or the like appearing on the page to which the index tab is attached.

Another object is to provide cards without pictures, but carrying the names of the words or the like appearing in the dictionary, the spelling on the card and in the dictionary being preferably of identical script.

A further object is to provide such cards in colors with the words or the like grouped so that those appearing on cards of a prescribed color will be easy, those of another prescribed color slightly harder, and still further groups of cards, each group being of different color, and the words thereon becoming progressively harder from group to group. The groups are carefully graded according to what teaching experience has shown as to usefulness of vocabulary as well as ease of learning. Deaf children, retarded children, children in isolated homes, or those who are for any other reason deprived of the incentive of measuring their progress by comparison with other children of their own age are encouraged to persistent effort by the definite steps in learning indicated by the use of color in the cards to distinguish progressively the more difficult expressions from the less difficult ones.

A further object is to provide a cut out test sheet having apertures registering with respective pictures on one or more of said pages but covering the words. The child can then test his proficiency by selecting colored word cards and attaching them with clips or other temporary means to the cut out sheet under the proper picture, then moving the cut out sheet with the cards attached to it down the page approximately one inch so as to expose the names under the pictures on the page. The child may thus check to see if he has placed the correct cards under the pictures.

A still further object is to provide a dictionary wherein the pages lie substantially flat in use.

A still further object is to provide in the dictionary, pages for the teaching of the alphabet, numbers, days, months, time, color, and direction.

A still further object is to provide strips containing the dictionary words in different script, such strips being adapted to be cut up and the proper words pasted under the corresponding pictures.

Other objects and advantages will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

Figure 1:
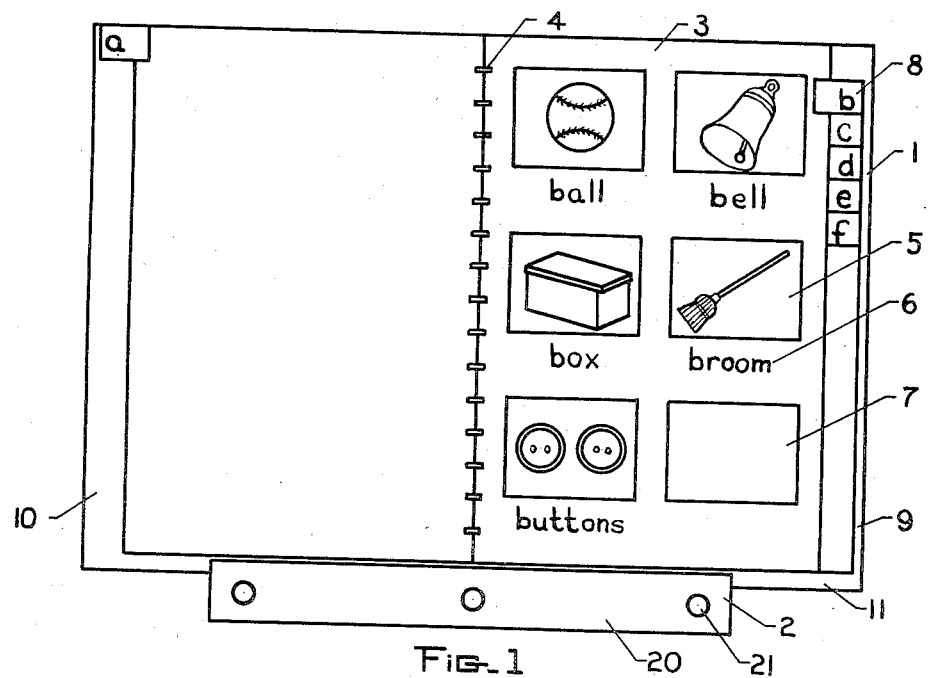
Figure 1 is a front view of the improved dictionary in open position and mounted on an easel.

Referring more particularly to the drawings, in Figure 1 is shown a dictionary 1 mounted on an easel 2. The pages 3 of the dictionary may be bound in any desired manner. One preferred form of binding is shown, and this consists of rings 4 which permit the pages of the dictionary to be turned, and lie flat after turning. The dictionary, however, is not limited to the use of such a hinge means, since obviously many other forms of construction can be satisfactorily used, and which will permit the pages to lie substantially flat. On each page 3 is shown a series of pictures of objects with the word name or noun corresponding thereto placed under each picture. These pictures may be arranged so that the easiest words appear in the upper left-hand corner of the page and become progressively more difficult as one progresses to the right and down, the pictures and words heterogeneously mixed up, or otherwise, but I prefer to place them in conventional dictionary order. The pictures with word names may be shown on both the front and back of each page, and if desired, some of the picture spaces and name spaces may be left blank for future insertion. It is intended that the diagrammatic showing of pictures 5 and word names 6 and blank space or spaces 7 will diagrammatically illustrate combinations wherein a multiplicity of pictures may appear on one or both faces of each page, completely filling same if desired, and wherein one or more blank spaces for future expansion may be optionally provided. A convenient system is to fill or substantially fill the right-hand page of the open book with pictures and their corresponding word names, and leave the left-hand page blank for expansion and teaching purposes.

The dictionary pages are preferably provided with a thumb index or alphabetical tab system, the tab 8 on each page being provided with a letter or letters corresponding to the first letter of object names on the page, and preferably agreeing identically in script therewith. For simplicity of illustration, only part of the tabs 8 are shown in Figure 1. By the term script is meant any alphabetical arrangement, which may be classed as manuscript print, solid capitals, lower case letters, handwriting, et cetera.

Figure 2:
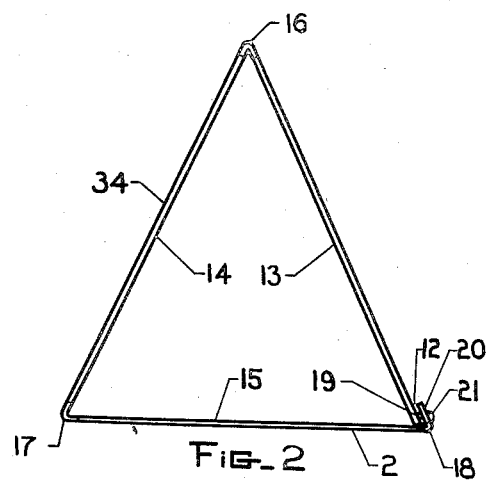
Figure 2 is an end view of a preferred form of easel.
Figure 3:
Figure 3 shows cards usable in conjunction with the dictionary.
Figure 3:
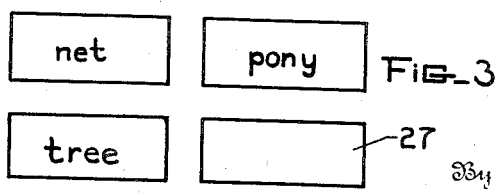

When constructing the dictionary for mounting on an easel 2, as shown in Figure 1, I prefer to make the dictionary covers 9 and 10 longer than the pages 3 of the dictionary so as to provide an extension 11 at the bottom of the dictionary. This extension 11 is adapted to fit into slot 12 (Figure 2) of the easel 2 and permit the pages 3 to be freely turned. One preferred form of construction of the easel 2 is shown in Figure 2. In this construction, sheets of stiff cardboard or the like 13, 14, and 15 are used. These cardboard members 13, 14, and 15 are preferably provided with hinges 16, 17, and 18 to facilitate folding and storing of the easel. Cardboard member 13 may be provided on its lower outer face with a strip 19 to act as a support for the extension 11 of the dictionary covers 9 and 10. Bottom cardboard member 15 is preferably provided with a flap member 20 having buttons 21 adapted to fasten to the lower end of cardboard member 13 to form an assembly such as is shown in Figure 2. When used with a dictionary having pages that are 17¼ inches wide by 21 inches high and which, for instance, may carry 20 pictures per page, a preferred size for the easel is one wherein the base is 15 inches wide and 24 inches long, and each side measures 19 inches high and 24 inches long. When using this easel, it may be set upright on a desk or low table and the angle will be suitable for use by a child while standing. The easel may also be laid on its side and the book laid on the other side, in which position the book will lie at a convenient angle for reading by the user when seated.

In addition to pages carrying words and picture definitions thereof, I prefer to incorporate in the dictionary 1 pages showing the alphabet 22, numbers, days, and months 23, colors 24, and a page showing clocks 25 for the teaching of time. Any suitable number of clocks may be shown for this purpose. However, in using a dictionary having pages 17¼ inches by 21 inches, I have found it convenient to show the faces of 30 different clocks, with the time indicated by the hands labeled beneath the particular clock pictured. In showing the clock pictures, I prefer to arrange them so that the easiest time to read is shown in the upper left-hand corner of the page, and then show other positions of the clock hands, so that in general they become gradually more difficult to read as one progresses across and down the page. With a little aid at the beginning, and the assistance of this clock page, even an inexperienced child can quickly learn to tell time.

To aid the child in learning the names of objects and their definition by pictures, I prefer to use a set of cards 26, each card carrying a name agreeing with a word name 6 appearing in the dictionary under a corresponding picture 5, the script used on the card preferably agreeing with that used in the dictionary 1 and on the tabs 8. In use, the child is handed a card 26, for instance, the one carrying the word "box". He then compares the first letter of the word with the letters on the tabs 8 until he finds the one which agrees with it, and then turns the pages until that tab is the last one remaining unturned to his left. He next compares the whole word on the card 26 with the words under the pictures until he finds the one which agrees. Having done this, the picture above the word defines pictorially the meaning thereof to him. In order to facilitate the teaching of children by means of these cards, and at the same time take advantge of the interest aroused by means of color, I prefer to print the words on cardboard of different colors. For instance, any suitable number, such as 10, of the easiest words may be printed on cards which may be yellow, 10 slightly harder words on cards which may be pink, and so on through other colors such as blue, green, orange, and red. There is no particular limitation as to the order of colors chosen, though once an order is chosen, it should be adhered to as an aid to simplicity of understanding and teaching, and to further aid in knowing at a glance the order of hardness. Each card can carry a small number, the number being the same for all cards of the same color, the easiest cards, for instance, carrying the number one. A preferred way of using these cards is to start the child with the easiest words or those printed on the yellow cards. After he has mastered these, then he can be given those of the slightly harder group which are printed on the pink cards, this procedure being continued until he has mastered all the words on the cards. Though all of the words in the dictionary may be placed on the cards, I prefer to use only part of them and then supply some additional blank cards 27 in color on which the teacher or parent can write, preferably in the same script used in the dictionary, some of the other words for the child to look up.

Figure 4:
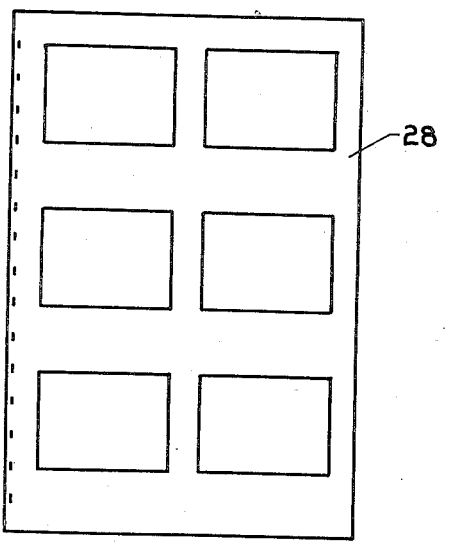
Figure 4 shows a cut out test sheet.

The dictionary may be provided with cut out sheets 28 (Figure 4) between each pair of pages, or such a sheet in loose form may be used for placing over any of the pages in the dictionary. This sheet is cut out in manner such that when laid over a dictionary page, it will leave the pictures visible, but will cover the names under same. In use, the cut out sheet 28 is laid over a page in the dictionary and the child finds as many cards as he can to name the pictures on the page and attaches them to the cut out sheet under the proper pictures. He then moves the cut out sheet down slightly to expose the names under the pictures to see if the cards he has placed correspond with the names under the pictures. In similar manner he may write in soft pencil or crayon on the cut out sheet the names below the pictures and move the sheet down to see if he has spelled the names correctly. This cut out sheet 28 may thus be used by the child for his own information and self-testing without the direct supervision of his parent or teacher. The parent or teacher may aid the child by directing him to name or spell the words or the like that are covered by the cut out sheet.

Figure 8:
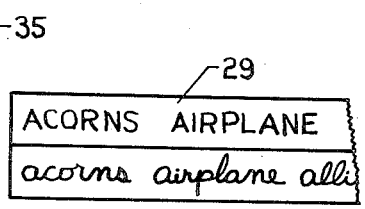
Figure 8 is a view of part of a strip, showing words in different script from that appearing in the dictionary.
Figure 9:
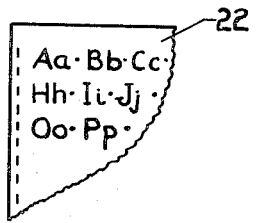
Figure 9 is a fragment of one of the dictionary pages showing the alphabet.
Figure 10:
Figure 10 is a fragment of one of the pages showing numbers, days, and months.
Figure 11:
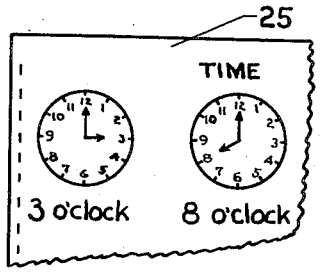
Figure 11 is a fragment of a page for teaching time by means of clock faces, numbers, and words.
Figure 12:
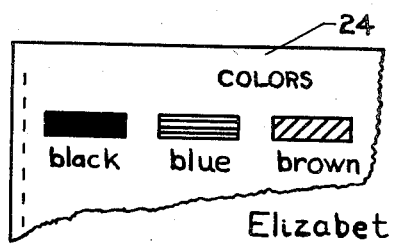
Figure 12 is a fragment of a page showing colors.

Manuscript type is one which is especially clear and well adapted for teaching beginners. The present dictionary, however, is not limited to the use of manuscript type, but other forms of script may be used if desired. Where the dictionary has been used by a child or group of children sufficiently long for him or them to become thoroughly familiar with it and the words under the pictures, it may be desirable to at least temporarily cover up the words printed in manuscript type and substitute therefor some other form of script, or even add a second line of some other form of script, thus advancing the teaching method with the proficiency attained by the student. To facilitate this, I prefer to supply a strip 29 (Figure 8) on which the same words appearing in the dictionary are printed in different script, for instance, solid capitals, lower case letters, handwriting, or the like. For facility of use, I prefer to provide a strip 29 with a gummed back, although this is not essential to the invention, since the teacher or parent may stick ungummed word strips in place with mucilage or the like or the child may attach them to the lower edges of the apertures in the cut out sheet by paper clips.

Figure 5:
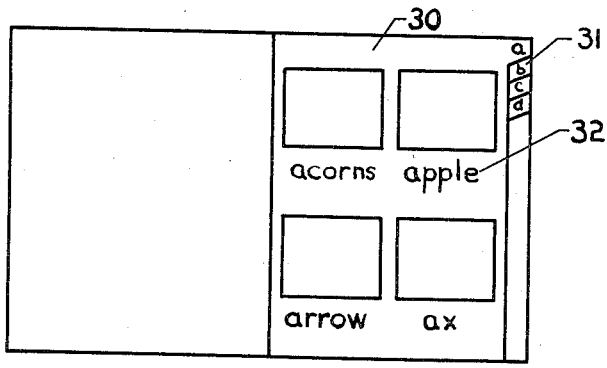
Figure 5 shows a work book with words but no pictures.
Figure 6:
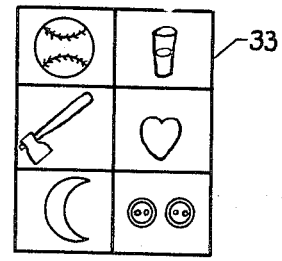
Figure 6 shows a sheet of pictures to be cut out and pasted in the work book shown in Figure 5.

The use of a work book 30 (Figure 5) in conjunction and cooperation with the dictionary is of a distinct aid in teaching. The work book 30 is provided with a thumb index 31, only part of which is shown, preferably corresponding in script with that in the work book and on the thumb index 3 of the dictionary 1. The pages of the work book are provided with words or object names 32 with blank spaces thereabove for pictures. A separate sheet 33 (Figure 6), which may have an adhesive coated back if desired, contains the pictures to be cut out and placed in the work book 30. These sheets 33 of pictures are preferably printed on colored paper, those pictures agreeing with the easy words in the work book 30 being printed on yellow paper, those slightly harder on pink paper, et cetera, as has been described above in connection with cards 26. While object names 32 on each page of the work book 30 may be arranged in any order, I prefer to use the easiest word in the upper left-hand corner and by passing to the right and down have the words become progressively more difficult. In using the work book and dictionary together, they cooperate for teaching and game purposes in the following manner: The child finds a word in his work book 30 and then turns to the dictionary 1 and finds on one of the tabs 3 a letter which corresponds with the first letter of the word he has chosen. He then opens the dictionary 1 at that point and goes over the page until the finds a duplicate of the word that he has chosen. This word will have over it the picture corresponding to the one which he is to put in his work book. He then turns to the sheet 33, finds the corresponding picture, cuts it out, and pastes it in his work book 30 over the object name 32 that he has been working with. This procedure is followed until his work book is filled.

Games may be played with the cards 26 and dictionary 1. One way that this may be done is to have the cards gathered together in groups or families. These groups may depend upon the sound of the words assembled, or may deal with the names of items used in furnishing a house, the names of animals, toys, articles of wearing apparel, et cetera. The cards are given to the child or children, and the words looked up, one at a time, in the dictionary to determine the pictorial definition of the particular word in question.

Figure 7:
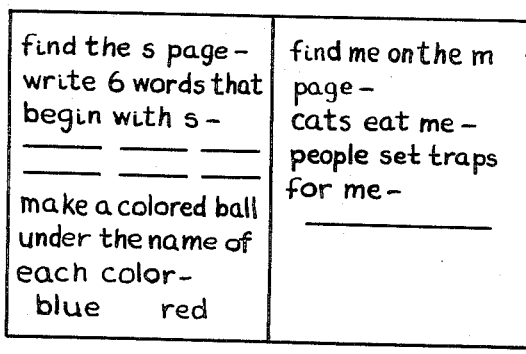
Figure 7 shows a question book with typical questions illustrated.

Games may also be played with the dictionary wherein the teacher, parent, or the child stands in front of the dictionary and says, for instance, "I spy a building where men work. It is on the 'F' page." The child being questioned then tries to guess the name of the object so described. If he succeeds in doing so, he can write the name on a blackboard. If more than one child is being questioned, then a corresponding number of columns can be placed on the blackboard and each time a correct answer is given, that word can be written in the column of the child so answering, the one having the most words written down at the end of the game being the winner. To facilitate teaching with the dictionary and the playing of this game and other blackboard games which require the use of the dictionary, I prefer to make the back face 34 of the easel 2 into a blackboard by means of the use of blackboard paint or the like. Various other games and educational combinations with the dictionary can be worked out, and one way to facilitate this is to use what might be termed a game book 35 (Figure 7). This game book, for instance, may be in the form of a drawing book, a riddle book, a spelling book, or the like, or combinations of these. The game book 35 shown in Figure 7 illustrates three typical questions for use in this manner. The color scheme noted above may be used in connection with the game books. Several game books would be used for this purpose, the easiest being printed, for instance, on yellow paper, slightly harder on pink, et cetera.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. In a dictionary for defining words or the like solely by means of pictorial illustrations, the combination which comprises a series of pages, each page of pictorial word definitions having a multiplicity of words all starting with the same letter, a picture above each word illustratively defining that word as its sole means of definition, and at least one cut out sheet having apertures registering with the respective pictures on at least one of the pages of said dictionary but covering the words so as to facilitate testing the proficiency of the student in naming the pictures either orally or by writing the names on said cut out sheet and then checking the correctness of such naming by moving said cut out sheet to expose the correct names of the pictures.

2. The combination with a dictionary defining solely by means of pictorial illustration a plurality of words or the like especially chosen for the use of children learning to read; a series of colored cards bearing expressions chosen from said dictionary and printed in type similar to that of said dictionary, such cards being of different colors so that the easier expressions appear on cards of one color, those slightly harder on cards of another color and so forth in graded series; at least one cut out sheet having apertures registering with the pictures on at least one of the pages of said dictionary but covering the words, said cut out sheet being adapted to have said colored cards identifying the pictures in said dictionary clipped or otherwise attached to it so that the upper edges of said cards register with the lower edges of the apertures of said cut out sheet, thus enabling the student to test himself by attaching said cards, then moving said cut out sheet to expose the current names of the pictures and comparing said cards with said names.

3. The combination with a dictionary defining solely by means of pictorial illustration a plurality of words especially chosen for the use of children learning to read; a series of colored cards bearing words chosen from said dictionary and printed in type similar to that of said dictionary, such cards being of different colors so that the easier words appear on cards of one color, those slightly harder on cards of another color, and so forth in graded series; at least one cut out sheet having apertures registering with the respective pictures on at least one of the pages of said dictionary but covering the words, said cut out sheet being adapted to mask the words under the pictures while permitting the use of said word cards identifying the pictures in said dictionary as shown through any one of the apertures; and thin strip material forming a part of said dictionary structure and bearing the words of said dictionary printed from type differing from that under the pictures in said dictionary and adapted to be used with the corresponding pictorial illustrations to extend the educational use of said dictionary.

ELIZABETH F. VANDER VELDE.